United States Patent [19]

Warner et al.

[11] 4,052,909
[45] Oct. 11, 1977

[54] POWER TRANSMISSION BELT

[75] Inventors: John Craig Warner, Ithaca, N.Y.; Mark William Gravel, Keokuk, Iowa

[73] Assignee: Borg-Warner Corporation, Chicago, Ill.

[21] Appl. No.: 722,938

[22] Filed: Sept. 13, 1976

[51] Int. Cl.² ............................................. F16G 1/00
[52] U.S. Cl. ............................................. 74/231 P
[58] Field of Search ................ 74/231 P, 233, 234, 74/231 C

[56] References Cited

U.S. PATENT DOCUMENTS

| | | | |
|---|---|---|---|
| 2,189,049 | 2/1940 | Ungar | 74/233 |
| 3,772,929 | 11/1973 | Redman, Jr. | 74/231 C |
| 3,968,703 | 7/1976 | Bellmann | 74/231 C |

Primary Examiner—Leonard H. Gerin
Attorney, Agent, or Firm—Aubrey L. Burgess

[57] ABSTRACT

An endless power transmission belt having a reinforcing tension and lateral stiffening means, an endless one-piece plastic member. The member is formed with alternate rod-like portions and hinge portions and the entire member is bonded to the elastomeric body of the belt. Such belt is especially adaptable for transmitting power in variable pulley drives and the like.

4 Claims, 3 Drawing Figures

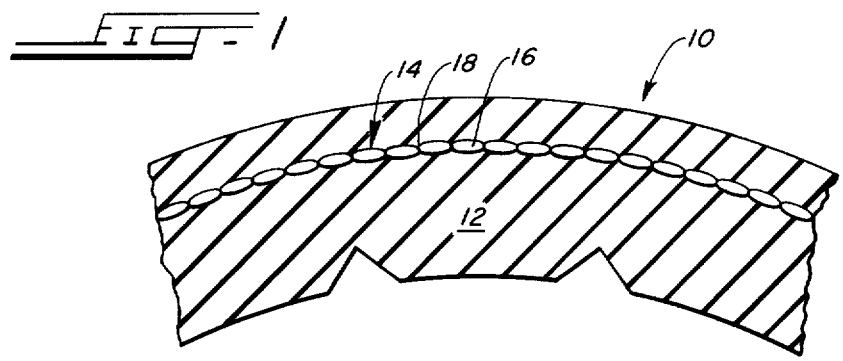
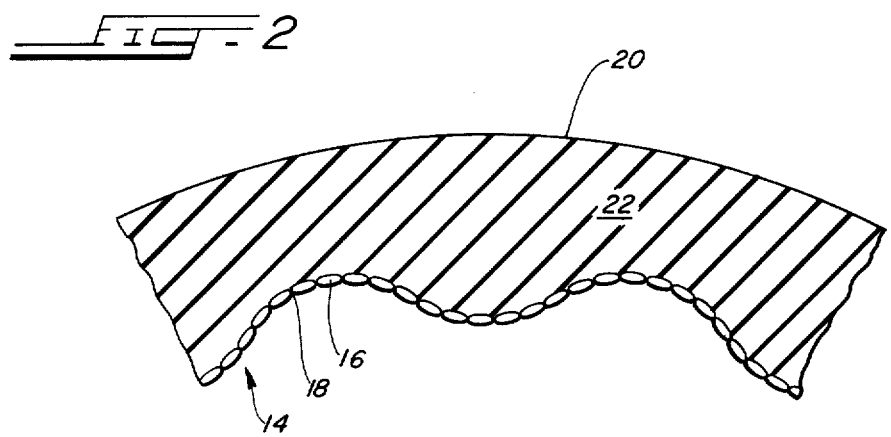
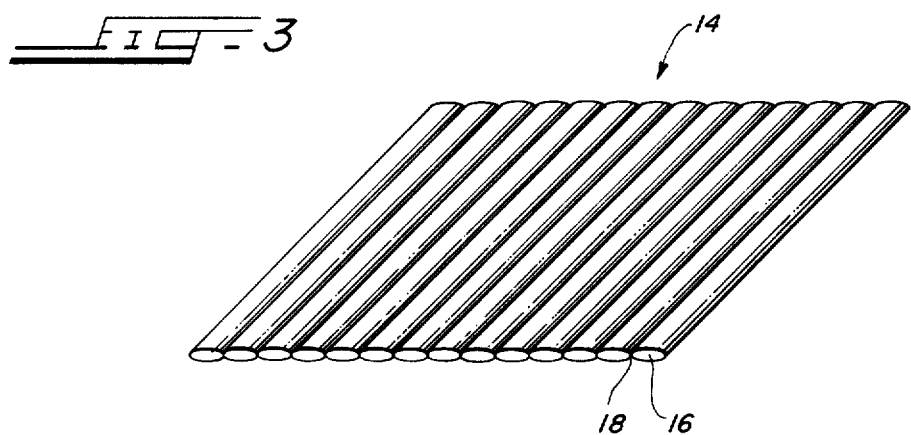

POWER TRANSMISSION BELT

BACKGROUND OF THE INVENTION

Power transmission belts comprising an elastomeric body reinforced with one or more helical winds of a cord, such as fiber glass strand and the like which are treated and/or coated to bond to the elastomer to thus form a tension member are well known in the art. Some belts include lateral members which provide lateral stiffness to the belt while permitting longitudinal flexibility for use to transmit power in variable pulley drives. Belts of this nature perform this function by engaging the pulley flanges with its edges. In the absence of the stiffeners, belts in such drives become arched and distort laterally with less than predictable results. Examples of belts with lateral stiffening means are described in U.S. patents to Unger and Redmond U.S. Pat. Nos. 2,189,049 and 3,772,929, respectively.

THE INVENTION

The power transmission belt of this invention comprises an elastomeric body having bonded thereto a reinforcing tension and stiffening member which comprises an endless, one piece, plastic member having alternate rod-like portions and hinge portions, the hinge portions being commonly referred to as "living" hinges. An example of a suitable plastic is polypropylene. The stiffening means may be bonded entirely within the body or bonded so as to cover an outside surface of the belt.

THE DRAWINGS

FIG. 1 is a partial sectional view of one form of power transmission belt constructed according to this invention;

FIG. 2 is a partial sectional view of another form of power transmission belt constructed according to this invention; and FIG. 3 is a partial view of a typical reinforcing tension-stiffening member usable in the belts of FIGS. 1 and 2.

DETAILED DESCRIPTION

Looking now at FIG. 1 of the drawing, there is illustrated a power transmission belt 10 comprising an elastomeric body 12 of rubber, synthetic rubber and the like with a tension-reinforcing-stiffening member 14, therein. The member 14 is separately illustrated in FIG. 3 and comprises an integral one piece plastic member having an alternate rod-like portions 16, which may be round, oval or other sectional configurations, joined by relatively thin, "living" hinge portions 18. A suitable material for "living hinges" is polypropylene. Thus, the member 14, is molded from polypropylene using known molding techniques.

The belt 10 is usually V-shaped in cross-section or can be any other section, as desired. It may be cogged, ribbed, flat or have other surface configurations. The outer surfaces can be cloth covered, as are some conventional belts. Conventional belts manufacturing techniques are employed to manufacture the belt.

The second embodiment of the belt identified as 20 of this invention, illustrated in FIG. 2, uses the tension-reinforcing-stiffening member 14 of FIG. 3 in a different manner. Here the member 14 is bonded to the belt and forms a surface thereof. The shape and method of manufacture of the belt 20 is the same as is described with reference to the FIG. 1 embodiment. In addition if additional reinforcing is desired, a helical wind cord or a woven cloth tension member is embedded in the elastomeric body 22 during its manufacture.

We claim:

1. A power transmission belt which comprises an elastomeric body and a longitudinally flexible and laterial stiff member bonded to said elastomer of said body, said member being of a plastic and having alternate relatively thin laterally extending portions and relatively thick and rod-like laterally extending portions, said member being of one piece and of a single plastic, said relatively thin portions acting as living hinges providing the longitudinally flexibility of the belt while said rod-like portions provide the lateral stiffness thereof.

2. A power transmission belt as recited in claim 1 wherein said plastic is polypropylene.

3. A power transmission belt as recited in claim 2 in which said member is embedded in the elastomeric body.

4. A power transmission belt as recited in claim 2 in which said member is a covering for one surface of said elastomeric body.

* * * * *